(12) United States Patent
Strock (10) Patent No.: US 10,697,464 B2
(45) Date of Patent: Jun. 30, 2020

(54) ABRADABLE MATERIAL

(71) Applicant: United Technologies Corporation, Farmington, CT (US)

(72) Inventor: Christopher W. Strock, Kennebunk, ME (US)

(73) Assignee: Raytheon Technologies Corporation, Farmington, CT (US)

(*) Notice: Subject to any disclaimer, the term of this patent is extended or adjusted under 35 U.S.C. 154(b) by 759 days.

(21) Appl. No.: 15/223,460

(22) Filed: Jul. 29, 2016

(65) Prior Publication Data

US 2018/0030993 A1 Feb. 1, 2018

(51) Int. Cl.
| | |
|---|---|
| *F04D 29/16* | (2006.01) |
| *C23C 4/073* | (2016.01) |
| *C23C 4/067* | (2016.01) |
| *B23P 15/02* | (2006.01) |
| *F04D 29/52* | (2006.01) |

(52) U.S. Cl.
CPC ............ *F04D 29/164* (2013.01); *B23P 15/02* (2013.01); *C23C 4/067* (2016.01); *C23C 4/073* (2016.01); *F04D 29/526* (2013.01); *F05D 2220/32* (2013.01); *F05D 2240/55* (2013.01); *F05D 2300/611* (2013.01); *Y02T 50/6765* (2018.05)

(58) Field of Classification Search
CPC ........ F01D 11/08; F01D 11/12; F01D 11/122; F01D 11/125; F01D 11/127; F04D 29/164; F04D 29/526; F05B 2240/57; F05B 2280/6011; C23C 4/06; C23C 4/067; C23C 4/11; Y10T 29/49323; B23P 15/00; B23P 15/02; B23P 15/008; B23P 2700/00; B23P 2700/01; B23P 2700/13; F05D 2300/611; C25D 15/00

USPC .................................................. 205/109, 110
See application file for complete search history.

(56) References Cited

U.S. PATENT DOCUMENTS

| | | |
|---|---|---|
| 4,299,865 A | 11/1981 | Clingman et al. |
| 4,386,112 A | 5/1983 | Eaton et al. |
| (Continued) | | |

FOREIGN PATENT DOCUMENTS

| | | |
|---|---|---|
| EP | 2067872 A2 | 6/2009 |
| WO | 2014137464 A1 | 9/2014 |
| WO | 2014151101 A1 | 9/2014 |

OTHER PUBLICATIONS

Luk, S. 'Bulk Properties of Powders', ASM Handbook, Aug. 2015, vol. 7, p. 111-126. [online]: ASM International [retrieved on Oct. 2019]. Retrieved from: ASM Digital Library. (Year: 2015).*

(Continued)

*Primary Examiner* — Moshe Wilensky
*Assistant Examiner* — Elton K Wong
(74) *Attorney, Agent, or Firm* — Bachman & LaPointe, P.C.

(57) ABSTRACT

A blade outer airseal comprising a body having: an inner diameter (ID) surface; an outer diameter (OD) surface; a leading end; a trailing end; a metallic substrate; and a coating system atop the substrate along at least a portion of the inner diameter surface. At least over a first area of the inner diameter surface, the coating system comprises an abradable layer comprising a metallic matrix and a filler. The filler forms at least 20% by volume of the abradable layer with agglomerates or aggregates of oxide particles, the oxide particles having a D50 size $\leq 200$ nm.

21 Claims, 3 Drawing Sheets

(56) References Cited

U.S. PATENT DOCUMENTS

| | | | | |
|---|---|---|---|---|
| 4,639,388 | A | * | 1/1987 | Ainsworth .............. B32B 15/04 428/117 |
| 4,696,855 | A | | 9/1987 | Pettit, Jr. et al. |
| 5,374,161 | A | * | 12/1994 | Kelch .................... F01D 11/005 277/641 |
| 5,976,695 | A | * | 11/1999 | Hajmrle .............. C22C 32/0089 277/941 |
| 6,025,034 | A | * | 2/2000 | Strutt ....................... B01J 13/02 427/212 |
| 8,562,290 | B2 | | 10/2013 | Stock et al. |
| 2008/0167173 | A1 | * | 7/2008 | Lima ........................ C09D 1/00 501/80 |
| 2008/0226879 | A1 | * | 9/2008 | Strock ....................... C23C 4/04 428/195.1 |
| 2009/0136740 | A1 | * | 5/2009 | Reynolds ................. C23C 4/06 428/325 |
| 2011/0254230 | A1 | * | 10/2011 | Jarosinski ............... C22C 27/06 277/444 |
| 2013/0071235 | A1 | | 3/2013 | Strock et al. |
| 2015/0132605 | A1 | | 5/2015 | Kumar et al. |
| 2015/0329954 | A1 | * | 11/2015 | Quet ........................ B05D 1/34 428/220 |
| 2016/0122552 | A1 | | 5/2016 | Strock et al. |

OTHER PUBLICATIONS

A Guidebook to Particle Size Analysis, Sep. 2014, Horiba Instruments, Inc., Irvine, CA.

European Search Report dated Dec. 15, 2017 for European Patent Application No. 17183881.6.

European Office action dated Feb. 11, 2019 for European Patent Application No. 17183881.6.

* cited by examiner

ABRADABLE MATERIAL

This disclosure relates to a gas turbine engine, and more particularly to gaspath leakage seals for gas turbine engines.

Gas turbine engines, such as those used to power modern commercial and military aircraft, generally include one or more compressor sections to pressurize an airflow, a combustor section for burning hydrocarbon fuel in the presence of the pressurized air, and one or more turbine sections to extract energy from the resultant combustion gases. The airflow flows along a gaspath through the gas turbine engine.

The gas turbine engine includes a plurality of rotors arranged along an axis of rotation of the gas turbine engine. The rotors are positioned in a case, with the rotors and case having designed clearances between the case and tips of rotor blades of the rotors. It is desired to maintain the clearances within a selected range during operation of the gas turbine engine as deviation from the selected range can have a negative effect on gas turbine engine performance. For each blade stage, the case typically includes an outer airseal located in the case immediately outboard (radially) of the blade tips to aid in maintaining the clearances within the selected range.

Within the compressor section(s), temperature typically progressively increases from upstream to downstream along the gaspath. Particularly, in relatively downstream stages, heating of the airseals becomes a problem. U.S. patent application Ser. No. 14/947,494, of Leslie et al., entitled "Outer Airseal for Gas Turbine Engine", and filed Nov. 20, 2015 ('494 application), the disclosure of which is incorporated by reference in its entirety herein as if set forth at length, discusses several problems associated with heat transfer to outer airseals and several solutions.

The airseal typically has an abradable coating along its inner diameter (ID) surface. In relatively downstream stages of the compressor where the blades have nickel-based superalloy substrates, the abradable coating material may be applied to a bondcoat along the metallic substrate of the outer airseal. For relatively upstream sections where the compressor blades comprise titanium-based substrates (a potential source of fire) systems have been proposed with a fire-resistant thermal barrier layer intervening between the bondcoat and the abradable material. An example of such a coating is found in U.S. Pat. No. 8,777,562 of Strock et al., issued Jul. 15, 2014 and entitled "Blade Air Seal with Integral Barrier".

Among coating application techniques are thermal spray processes such as air plasma spray. Typically, the plasma spray process involves a single feedstock outlet discharging a mixture of coating constituents and fugitive porosity former in to a plasma jet. Proposals have been made to segregate the porosity former and introduce it through a relatively downstream outlet while the matrix and solid lubricant are introduced from a conventionally located upstream outlet. Examples of these are found in U.S. Pat. No. 4,696,855, of Petit, Jr. et al., issued Sep. 29, 1987, and entitled "Multiple Port Plasma Spray Apparatus and Method for Providing Sprayed Abradable Coatings", and U.S. Pat. No. 4,299,865, of Clingman et al., issued Nov. 10, 1981 and entitled "Abradable Ceramic Seal and Method of Making Same". U.S. Pat. No. 4,386,112, of Eaton et al., issued May 31, 1983, and entitled "Co-Spray Abrasive Coating" shows separate introduction of matrix and abrasive in an abrasive coating.

SUMMARY

One aspect of the disclosure involves a blade outer airseal comprising a body comprising: an inner diameter (ID) surface; an outer diameter (OD) surface; a leading end; a trailing end; a metallic substrate; and a coating system atop the substrate along at least a portion of the inner diameter surface. At least over a first area of the inner diameter surface, the coating system comprises an abradable layer comprising a metallic matrix and a filler. The filler forms at least 20% by volume of the abradable layer with agglomerates or aggregates of oxide particles, the oxide particles having a D50 size ≤200 nm.

A further embodiment may additionally and/or alternatively include the particles having a D50 size ≤200 nm forming at least 50 weight percent of the aggregates.

A further embodiment may additionally and/or alternatively include a D50 size of the aggregates being 10 to 150 micrometers.

A further embodiment may additionally and/or alternatively include a D50 size of the aggregates being 22 to 45 micrometers.

A further embodiment may additionally and/or alternatively include a D50 size of the aggregates being 6 to 45 micrometers.

A further embodiment may additionally and/or alternatively include the filler comprising alumina, silica, titania, zirconia, hafnia, dysprosia, gadolinia, yttria, magnesia, nickel oxide, and/or chromia forming at least 40% by volume of the abradable layer.

A further embodiment may additionally and/or alternatively include the filler comprising alumina and magnesia forming aggregates that occupy at least 40% by volume of the abradable layer.

A further embodiment may additionally and/or alternatively include the magnesia forming 0.1% to 2% weight percent of the total of alumina and magnesia.

A further embodiment may additionally and/or alternatively include the metallic matrix comprising an MCrAlY.

A further embodiment may additionally and/or alternatively include the matrix forming 20-35 volume % of the abradable layer.

A further embodiment may additionally and/or alternatively include a Vickers hardness of the abradable layer being 300 with a 50 g load.

A further embodiment may additionally and/or alternatively include the abradable layer having 20-45% matrix by volume.

A further embodiment may additionally and/or alternatively include the abradable layer having a cohesive bond strength of 500-3000 psi.

A further embodiment may additionally and/or alternatively include the abradable layer having 30-80% said filler by volume.

Another aspect of the disclosure involves a method for manufacturing the blade outer airseal. The method comprises thermal spray of the abradable layer.

A further embodiment may additionally and/or alternatively include the thermal spray uses a source material for the filler having the aggregates.

A further embodiment may additionally and/or alternatively include the source material comprises said aggregates having particle D50 size of 10 nm to 50 nm.

Another aspect of the disclosure involves a method for manufacturing a blade outer airseal, the method comprising thermal spray of a metallic matrix and a filler. The filler comprises oxide particles. The filler is sprayed from a source having agglomerates or aggregates of said oxide particles, said particles having a D50 size of <200 nm.

A further embodiment may additionally and/or alternatively include the D50 size being 10 nm to 50 nm.

A further embodiment may additionally and/or alternatively include the metallic matrix being sprayed from a source having particles of the matrix with a D50 size of 22-90 micrometers.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
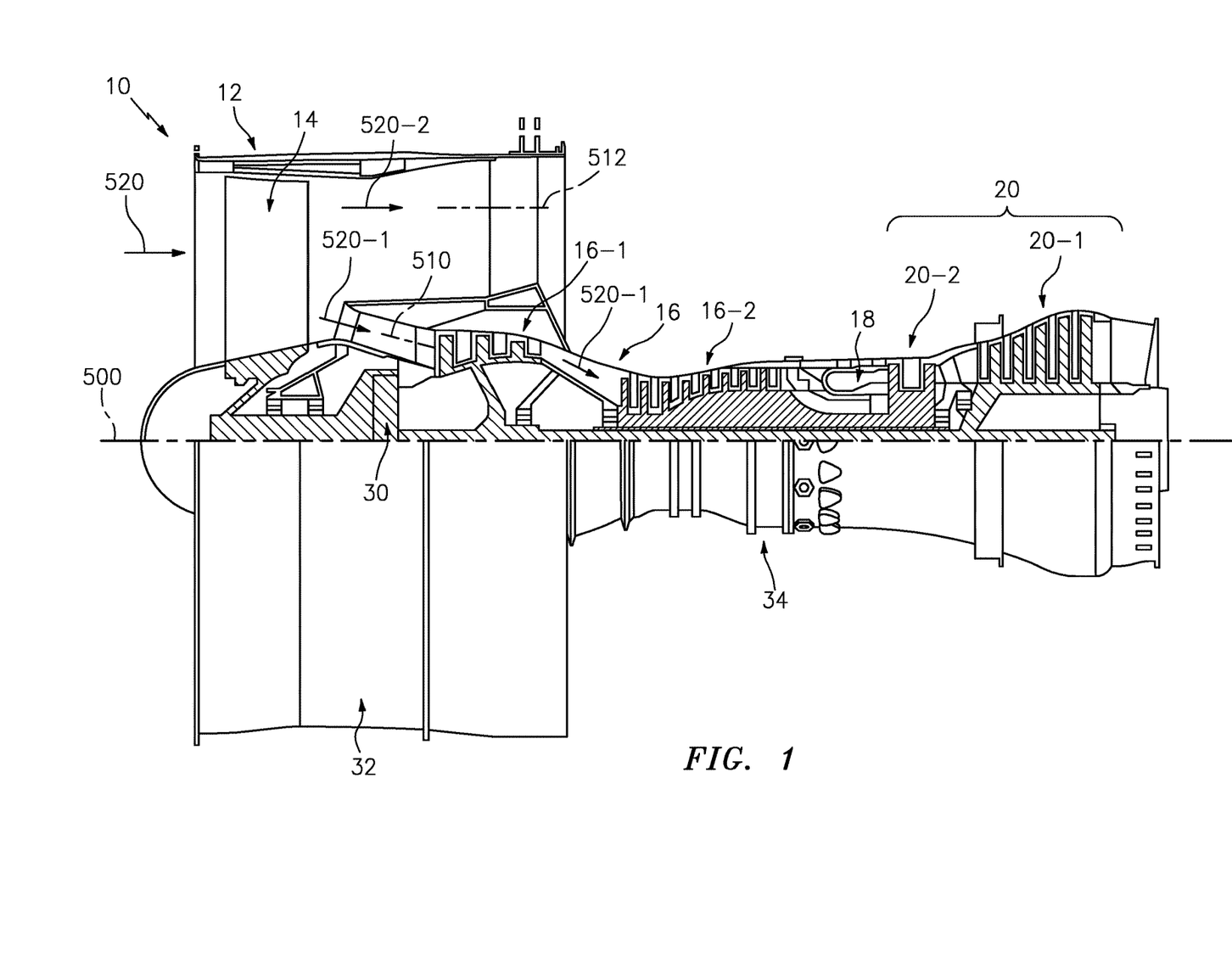
FIG. 1 is a schematic axial half cross-sectional view of an embodiment of a gas turbine engine.

FIG. 1 is a schematic illustration of a gas turbine engine 10. The illustrated engine is a turbofan used to produce propulsive thrust in aerospace applications. Broadly, relevant gas turbine engines may also include turbojets, turboprops, industrial gas turbines (IGT), and the like. For purposes of illustration, outer aerodynamic cases are not shown. The gas turbine engine has a central longitudinal axis 500. The gas turbine engine generally has a fan section 12 through which an inlet flow 520 of ambient air is propelled by a fan 14, a compressor 16 for pressurizing the air 520-1 received from the fan 14, and a combustor 18 wherein the compressed air is mixed with fuel and ignited for generating combustion gases. The inlet flow 520 splits into a first or core portion 520-1 flowing along the gaspath (core flowpath) 510 and a bypass portion 520-2 flowing along a bypass flowpath 512. The illustrated engine 10 and gross features of its airseals (discussed below) are based on a particular configuration shown in the aforementioned '494 application. Nevertheless, the teachings herein may be applied to other general engine configurations and other general airseal configurations.

The gas turbine engine 10 further comprises a turbine 20 for extracting energy from the combustion gases. Fuel is injected into the combustor 18 of the gas turbine engine 10 for mixing with the compressed air from the compressor 16 and ignition of the resultant mixture. The fan 14, compressor 16, combustor 18, and turbine 20 are typically all concentric about a common central longitudinal axis 500 of the gas turbine engine 10.

Depending upon the implementation, the compressor and turbine may each contain multiple sections. Each section includes one or more stages of rotor blades interspersed with one or more stages of stator vanes. The exemplary configuration has two compressor sections and two turbine sections. From upstream to downstream along the gaspath 510, these include a low pressure compressor section (LPC) 16-1, a high pressure compressor section (HPC) 16-2, a high pressure turbine section (HPT) 20-2, and a low pressure turbine section (LPT) 20-1. The exemplary rotors of the LPC and LPT are formed to rotate as a first unit or low pressure spool with the LPT driving the LPC. Similarly, the HPT and HPC rotors are arranged as a high pressure spool. The fan may be driven by the low pressure spool either directly or via a reduction gearbox 30. Other configurations are, however, known. Whereas illustrated in the context of compressors 16, one skilled in the art will readily appreciate that the present disclosure may be utilized with respect to turbines (e.g., an LPT where temperatures are relatively low).

Figure 2:
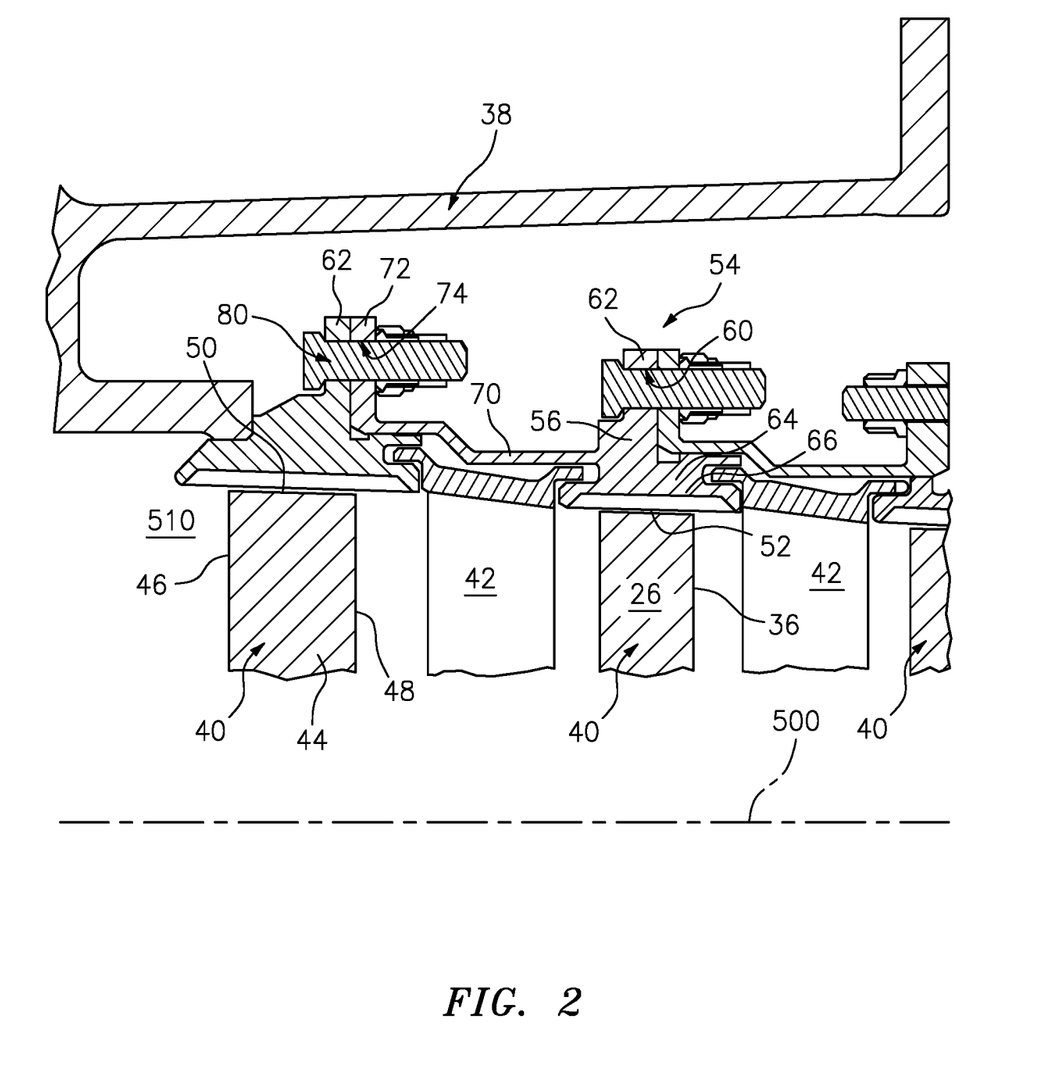
FIG. 2 is a schematic axial cross-sectional view of an embodiment of a compressor of the gas turbine engine.

The exemplary engine comprises a fan case 32 and a core case 34. The core case has sections along the corresponding sections of the engine core. FIG. 2 shows an HPC case section 38 of the core case 34 along the HPC.

FIG. 2 schematically shows several stages of blades 40 of the HPC rotor. Interspersed with the blades are stages of stator vanes 42. Each blade has an airfoil 44 having a leading edge 46, a trailing edge 48, a pressure side (not shown) and a suction side (not shown) and extends from an inboard end to an outboard tip 50. The tip 50 is in close facing proximity to an inner diameter (ID) surface 52 of an outer airseal 54. Each exemplary outer airseal 54 includes a metallic substrate 56 and an abradable coating system (or rub strip) 58 (FIG. 2A) forming the ID surface 52 along an ID surface of the substrate.

The exemplary outer airseal 54 is formed as a generally full annulus (e.g., locally interrupted by mounting features such as a circumferential array of holes 60 in a radially outwardly extending flange 62). In cross-section, the exemplary outer airseals 54 comprise an inboard body or band 64 comprising a body or band 66 of the substrate and the rub strip 58 inboard thereof. The flange 62 extends radially outward from the band 66. For mounting the exemplary airseals, at a forward end of the flange 62, an axial collar portion 70 extends forwardly to terminate in a radially outward extending flange 72. The flange 72 has mounting holes 74 complementary to mounting holes of an adjacent mating flange. FIG. 2 shows several airseal stages associated with respective blade stages. Each flange 72 may mate to a flange 62 of the next forward airseal and be secured thereto via fasteners (e.g., threaded fasteners) 80.

Figure 2A:
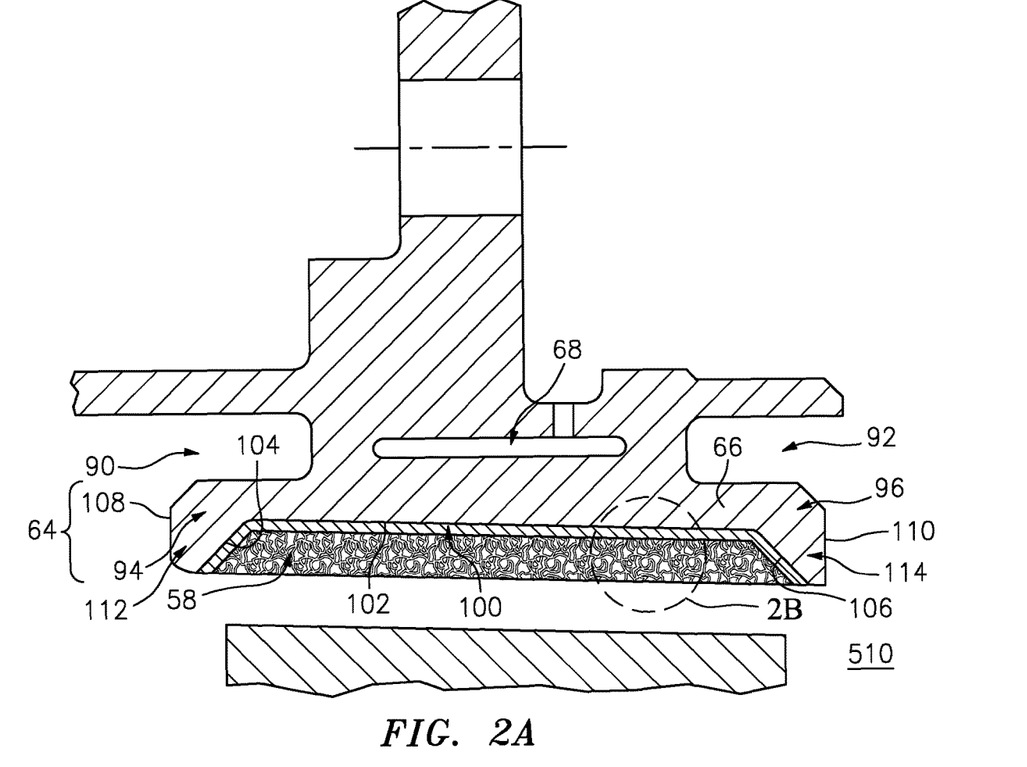
FIG. 2A is a schematic axial cross-sectional view of an embodiment of an outer airseal of the compressor of the a gas turbine engine at detail 2A of FIG. 2.

FIG. 2A further shows respective fore and aft channels 90 and 92 outboard of corresponding cantilevered portions 94 and 96 of the substrate band 66 for capturing associated flanges of adjacent stages of stator segments.

As is discussed in aforementioned '494 application, heat transfer to the flanges 62 and 72 is a source of problems. Steps that have been undertaken to address this include: making the flange 62 appropriately massive; and adding cooling features 68 such as those in the '494 application. The massiveness of the flange 62 functions in several ways. First, for a given amount of heat transfer to the band 66, and thus from the band to the flange 62, the temperature increase experienced by the flange will be smaller for more massive flanges. Second, a more massive flange 62 can more easily mechanically resist expansion caused by heating of the band 66 due to greater strength of the more massive flange.

As is discussed below, however, the rub strip 58 may be configured to influence heat transfer from the gaspath 510 ultimately to the flange 62. In various implementations, use of the rub strip to assist in thermal management may allow reduced massiveness of the flange and/or may allow reduction or elimination of cooling features such as those shown in the '494 application. Nevertheless, the thermal management associated with the rub strip 58 may be used in conjunction with such other features.

The exemplary rub strip 58 (FIG. 2A) is located in an inwardly (radially) open annular channel 100 or well in the substrate band portion 66. The channel has a surface comprising a base surface 102 and respective fore and aft surfaces 104 and 106.

The band 66 extends from a forward rim 108 to an aft rim 110 and has forwardmost and aftmost portions 112 and 114 respectively forward of and behind the channel 100.

The rub strip 58 may be formed with multiple layers. A base layer 124 (FIG. 2B) may be a bondcoat atop an inner diameter (ID) surface portion of the substrate band formed by the channel surfaces (102, 104, 106). An optional thermal barrier coating (TBC) layer 126 is at least locally atop the bondcoat. An abradable layer 128 is at least locally atop the TBC layer (or atop the bondcoat if no TBC layer or otherwise positioned). The abradable layer 128 may represent modification of any appropriate prior art or future abradable layer composition. The TBC layer 126, if present, may be selected for insulative purposes to limit or tailor the flow of heat from the gaspath 510 to the substrate 56.

Figure 2B:
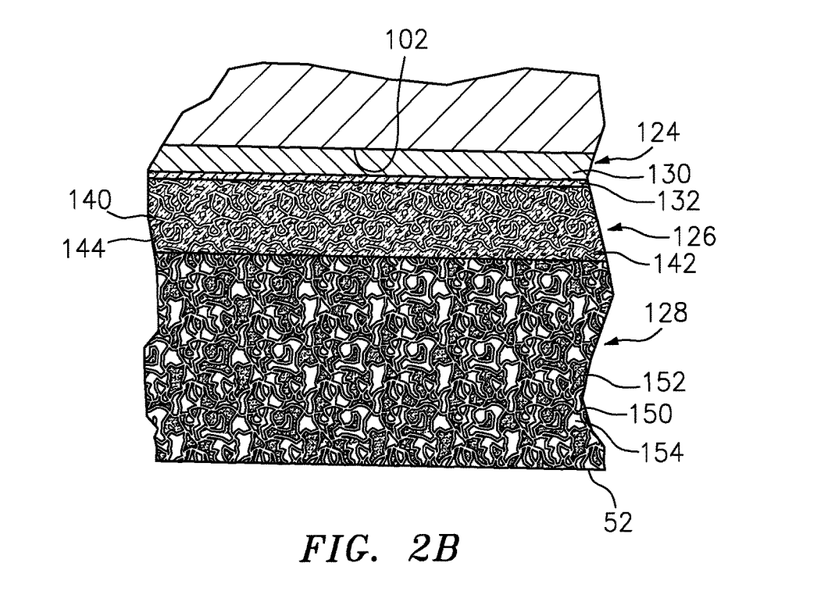
FIG. 2B is a coating cross section at detail 2B of FIG. 2A.

The exemplary bondcoat 124 includes a base layer 130 and a thermally grown oxide (TGO) layer 132. The base layer and TGO layer may originally be deposited as a single precursor layer. There may be diffusion with the substrate. The TGO layer may reflect oxidation of original material of the precursor. Exemplary base layer thicknesses are 10-400 micrometers, more narrowly 20-200 micrometers. Exemplary TGO layer thicknesses are 0.05-1 micrometers, more narrowly 0.1-0.5 micrometers. Alternative bondcoats include diffusion aluminides. Improved bonding with the substrate may alternatively be provided by roughening the substrate, for example by laser melting and/or ablation.

An exemplary coating process includes preparing the substrate (e.g., by cleaning and surface treating). A precursor of the bondcoat is applied. An exemplary application is of an MCrAlY, more particularly a NiCoCrAlY material. An exemplary MCrAlY is Ni 23Co 17Cr 12Al 0.5Y. An exemplary application is via a spray (e.g., a thermal spray) from a powder source. Exemplary application is via air plasma spray (APS). Alternative methods include a high-velocity oxy-fuel (HVOF) process, a high-velocity air-fuel (HVAF) process, a low pressure plasma spray (LPPS) process, or a wire-arc process.

An exemplary application is to a thickness of 0.003-0.010 inch, (76-254 micrometers) more broadly 0.001-0.015 inch (25-381 micrometers).

After the application, the precursor may be diffused. An exemplary diffusion is via heating (e.g., to at least 1900° F. (1038° C.) for a duration of at least 4 hours) in vacuum or nonreactive (e.g., argon) atmosphere. The exemplary diffusion may create a metallurgical bond between the bondcoat and the substrate. Alternatively diffusion steps may occur after applying the TBC, if at all.

After application of the bondcoat precursor, if any, the substrate may be transferred to a coating apparatus for applying the TBC 126, if any, and abradable layer 128. An exemplary application is via a spray (e.g., a thermal spray) from a powder source. Exemplary application is via air plasma spray (APS). Alternative methods include a high-velocity oxy-fuel (HVOF) process, a high-velocity air-fuel (HVOF) process, a low pressure plasma spray (LPPS) process, or a wire-arc process. Alternative techniques involve consolidated and sintered powder including pressing, tape casting, and vibratory consolidation. These may include direct write, DMLS and laser fusing 3D printing with or without binders. As an alternative to in situ formation directly on the substrate (optionally with a bond coat or other layer(s)) pre-formed layers may be brazed or adhesively bonded or otherwise to the substrate (or to an intervening layer).

An exemplary TBC 126 comprises a single ceramic-containing layer of a single nominal composition. Multi-layer and graded composition embodiments are also possible. An exemplary abradable layer 128 is a metal matrix composite. An exemplary metal matrix composite comprises the metal (alloy) matrix, a solid lubricant, and porosity.

The exemplary TBC 126 contains metal (alloy) 140 and porosity 142 in addition to the ceramic 144. The exemplary by volume content of metal in the TBC is less than in the abradable layer. Exemplary alloys include Cu—Ni alloys (e.g., Cu26Ni8.5Al 4Cr) or an MCrAlY (although the Y may be eliminated in lower temperature engine locations).

Within the TBC 126, an exemplary ratio of ceramic 144 to metal 140 by volume is between 3:1 and 50:1, more particularly between 5:1 and 20:1 or between 5:1 and 10:1 or an exemplary about 7:1. An exemplary remainder (e.g., porosity plus solid lubricant in some embodiments as discussed below) is up to 70% by volume, more particularly 2% to 70%, or 5% to 60% or 20% to 50% or 30% to 45% or an exemplary about 40%.

The ceramic 144 (e.g., a stabilized zirconia such as a yttria-stabilized zirconia (YSZ), particularly 7YSZ) contributes to the composite low conductivity and strength. The metal 140 greatly increases toughness and spallation resistance. Porosity (if any) created inherently by the application (e.g., spray) process and/or via addition of a fugitive filler material further reduces conductivity, but also contributes to reduced elastic modulus, coating stress and tendency to spall (i.e., both the metallic content and porosity increase the possible thickness of the TBC 126 and therefore maximum thermal resistance of the system). At some point with increasing porosity the TBC gets weak and allows abradable spallation. To mitigate this, the TBC may be selected to be stronger than the abradable.

The exemplary abradable layer 128 contains metal (alloy) 150 and a solid lubricant 152. It may further contain porosity 154.

A very broad range of relative contents of solid lubricant and porosity are possible in the abradable layer 128. Within the abradable layer 128, an exemplary by volume content of the metal is 20% to 50%, more particularly 25% to 40%, or an exemplary about 35%. An exemplary porosity is up to 70% by volume, more particularly 1.0% to 70%, or 1.0% to 40%, or 1.0% to 30%; or 10% to 30% or 15% to 30% or an exemplary about 20% in embodiments that have significant porosity. Other embodiments may target low porosity (e.g., 0% to 10% or 1% to 6% or 2% to 4%) with high solid lubricant content. Exemplary solid lubricant 152 volumetric contents are at least 5% or at least 20% or an exemplary 20% to 60% in higher porosity layers and 60% to 80% or 70% to 80% or 75% to 80% in the low porosity embodiments.

In the low porosity abradable layer embodiments, porosity may be lower in the abradable layer than in the TBC (substantially lower in embodiments where the TBC or a main portion thereof does not include any of the solid lubricant but has only the ceramic, metal, and porosity). In either situation, the abradable layer would have lower cohesive bond strength than the TBC. In embodiments where the cohesive strength of the abradable layer is equal to or higher than that of the TBC, the risk of sheet spallation from the TBC would be unacceptable.

Exemplary solid lubricants include hexagonal boron nitride (hBN) (e.g., commercially pure hBN or a mixture such as 10 wt % bentonite agglomerated hBN). The selection of porosity to hBN ratio may involve both engine operational requirements and economics. HBN is relatively expensive compared with porosity formers. Whereas high porosity coating versions will be lower cost to produce, the resultant roughness and porosity of the coating may cause greater aerodynamic losses than those with relatively lower porosity and higher hBN content. In order to improve the economics of low porosity, high hBN coatings, a binder material such as bentonite may be used to improve the deposition efficiency of the hBN. Nanoscale oxides may be fully or partially substituted for hBN in the abradable. More specifically, these may include metal and/or rare earth oxides. Examples include alumina, silica, titania, zirconia, hafnia, dysprosia, gadolinia, yttria, magnesia, nickel oxide, and/or chromia. When in combination, the combinations may be of mixtures and/or alloys.

Such oxides may function to impart increased friability to the coating.

Distinguished from merely lowering matrix content, the nanoscale oxides may have the effect of finely dividing the regions that would otherwise be individual pores of the porosity. It also partially fills such regions so as to reduce gaspath surface roughness and thus aerodynamic losses. Both such factors also contribute to reduced gas permeability and the associated aerodynamic losses.

Distinguished from solid lubricant, the nanoscale oxides may have the effect of increasing the coefficient of wear of the abradable coating. This may increase the friction coefficient and more readily abrade the abradable surface to reduce contact pressures and preserve blade life.

The nanoscale oxides may be characterized as a soft filler. This may be measured as an aggregate compressive strength (discussed below).

Alumina variants are of particular interest. One group of variants involve a small amount of magnesia. A small amount of magnesia (e.g., about 0.5 weight percent of the alumina-magnesia total, more broadly 0.1% to 2%) is an economical variant where magnesia acts as a grain growth inhibitor to retard sintering densification and retain the desirable friable nature of aggregate particles of the nanoscale oxides (discussed below) after spray deposition.

Alumina-titania systems may provide similar performance benefit at greater cost due to the higher required amount and cost of titania (e.g., about 10 wt % of the alumina-titania system, more broadly 5% to 20%).

Alternatively or additionally to the alumina, rare earth oxides such as dysprosia, yttria and, more preferably gadolinia are useful for their ability to react with CMAS (calcium-magnesium-alumino-silicate) contaminants downstream in the hot sections of the engine (as wear debris dust) to reduce CMAS induced damage to thermal barrier and outer air seal coatings in the combustor and power turbine. These oxides are also low toughness compared with zirconia and alumina which low toughness is desirable in filler in abradable material. The believed mechanism is increasing the melting point and viscosity of the molten CMAS which reduces the depth of penetration into TBC coatings and the resultant damage upon heating and cooling cycles experienced during engine operation.

The spray feedstock containing the nanoscale oxide(s) may result from a multi-stage manufacture process. This process may involve making or otherwise obtaining initial powder(s) of the nanoscale oxide(s). For example, initial powder(s) may be manufactured by appropriate methods such as pyrolysis. Exemplary pyrolysis manufacture of silica, for example, comprises the oxidation of silane gas in an oxygen-hydrogen flame.

Subsequent steps may include agglomeration (e.g., forming a slurry and drying) followed by heat treating. The heat treating serves to calcine and sinter forming an aggregate. The aggregate may then be directly used as a spray feedstock or further processed (e.g., combined with other components). In one example of a mixture (e.g., alumina-magnesia) separate initial powders of the two are mixed with each other and a solvent to form a single slurry for agglomeration and subsequent steps.

The aggregate may have low fraction of their theoretical density (i.e., high porosity, ≥50 v % or more specifically 70 v %).

The initial powder(s) are individual particles of ≤200 nm and more specifically ≤100 nm (e.g., 10 nm to 50 nm). This may be measured as a mean, median, or modal value such as a D50 value. The original particulate manufacture process may leave these sub-particles partially agglomerated into larger units (e.g., as received from a manufacturer even before the nominal agglomeration process above).

As noted above, these particles are then further agglomerated such as by a forming a slurry and spray drying.

As an alternative to the spray drying, the agglomerates may be formed by crushing and sieving a dried bed of slurry.

To form the slurry, the initial particles are suspended in a solvent such as water or alcohol with optional binder such as PVA. The material may then be subject to the spray drying or bed drying/crushing/sieving. Binder may be added to the slurry. The binder may aid in formation and handling of the agglomerated sub-particles before being removed during subsequent heat treatment.

The particles may then be bound together into aggregates by sintering of the initial agglomerated particles. This sintering may be by heat treatment in a furnace or by passing the agglomerated particles through a heated gas stream or plasma stream. The result is to shrink the agglomerated particles by removing water and sintering and calcining. This forms aggregates of sufficient strength to survive into the coating but low enough strength to be broken apart by contact with the airfoil.

As an alternative to starting with powder(s) of the oxide(s) and then using a solvent to form agglomerate(s), a continuous precipitation reaction may be used where the precipitation reaction solvent becomes the solvent of the slurry. In examples of the precipitation reaction, the precipitated particles in the agglomerates may be oxide(s) or precursor(s) of oxide(s). A precursor example is a hydrated form of the oxide (e.g., aluminum hydroxide).

Exemplary aqueous production includes sol-gel processes where a metal-containing precursor is precipitated from solution, typically as a hydrated form of the oxide. For example magnesia may be produced by a sol-gel method by reacting 1 molar aqueous or alcohol solutions of magnesium nitrate $Mg(NO_3)_2 \cdot 6H_2O$ and oxalic acid $(COOH)_2 \cdot 2H_2O$ in a 1:1 molar ratio. The magnesium nitrate solution is stirred and the oxalic acid is atomized and sprayed onto the moving surface of the magnesium nitrate solution. Upon mixing, reaction takes place to precipitate magnesium hydroxide nanoparticles of 10 nm to 50 nm depending on exact process parameters used. The magnesium hydroxide is then converted to magnesium oxide in the subsequent heat treatment.

Aluminum hydroxide may be produced similarly using an aluminum nitrate or other precursor. Aluminum hydroxide may be produced concurrently with magnesium hydroxide by using a mixed solution of the metal oxide precursors to form the precipitate suspension/slurry.

Binder or a binder-containing solution (e.g., PVA is commercially distributed as a solution) may be added to the precipitate suspension/slurry prior to spray drying or the like. The subsequent calcinization removes the water from the molecules to form the pure oxide which has improved thermal stability. Sintering forms necks between individual grains, and increases density, strength and grain size.

Properties (e.g., strength and percent of theoretical density) of the aggregates may be controlled by processing parameters along the entire manufacturing route. Particularly important parameters are sintering temperature and time, v % binder content (1-10 wt % of total solids), slurry solids loading (1-10 wt % oxide equivalent) and degree of dispersion or agglomeration of the primary particles.

Exemplary aggregates have about 70-90 v % porosity. Exemplary aggregates have a compressive strength of 50 to 250 psi (0.34-1.7 MPa) more particularly 50 to 100 psi (0.34-0.69 MPa) as determined by bulk powder compressibility where quoted compressive strength is defined as the pressure required to get a 25% reduction in volume from a starting condition of 10 psi (69 kPa) preload.

Exemplary aggregate size is from 10 to 150 micrometers, 10-75 micrometers and more specifically 22 to 45 micrometers for a spray process that uses individual, non-agglomerated (e.g., as distinguished from agglomeration of the aggregates with a binder and optionally the matrix material) powder particles (e.g., air plasma spray with separate or blended powder injection for each constituent powder). This may be measured as a D50 value or by mesh size that limits upper and lower particle size of the distribution such as to the values noted. If agglomerated with the matrix metal, smaller aggregate particles may be used in the ranges of 6-75 micrometers, 6-45 micrometers, and more specifically 6-22 micrometers.

Exemplary matrix particle size is 22-90 micrometers or narrower 22-75 micrometers (or more broadly 45-90 micrometers) and could go down to 11 micrometers minimum and 150 maximum in extreme cases. At the low end, manufacturability may be compromised due to difficulty feeding fine powders and the problems with dust accumulation on the powder injectors and plasma nozzle unless further agglomeration is performed with the filler aggregates. In this case, particles as fine as 6 micrometers could be used, but the practical limit may still be 11 micrometer. At 150 micrometers there could be problems melting the powder during spray and larger regions of metal would be present in the coating.

Larger islands of metal may be detrimental in that they have higher strength and are more resistant to breaking off during a rub event. That results in increased contact pressure and can cause blade wear, generally, and initiate transfer of blade material to the abradable material, in particular. The oxide may be used to limit the size and related strength or hardness of the high metal concentration regions of the coating.

Desired maximum Vickers micro-hardness of a coating cross section at room temperature is 400 or more desirably 300 with a 50 g load (in any location when 100 randomly located indents are made on the cross section of a sample infiltrated with epoxy mounting material).

Application processes include conventional air plasma spray, high velocity plasma spray, combustion flame spray, HVOF, HVAF, and the like. They may be with a blended powder of the metallic matrix powder, oxide powder, and porosity former. For example, the matrix alloy particles may be agglomerated with the oxide agglomerates or the aggregates, held together with a binder such as 1-5 wt % PVA. Or these may be introduced through separate ports at the same axial position or at multiple axial locations.

The resultant coating may have 20-45% matrix by volume, more particularly 20-35%. In some implementations, this may replace a coating with higher matrix content. The soft filler content may be 25 to 80 percent of the coating by volume. Coating porosity may be 0 to 40% of the non-agglomerate or non-aggregate volume (i.e. the porosity within the oxide agglomerates or the aggregates is considered to be part of the oxide agglomerates or aggregates). More desirably, the porosity of the coating is less than the volume fraction of oxide agglomerates or aggregates.

In the spray process, the agglomerates or aggregates are heated and accelerated toward the deposition surface where they become part of the coating. The soft filer particles may become part of the coating by embedding in the surface texture of the coating during buildup or may stick to the coating as it builds due to a softened or melted surface layer. While deposition efficiency of the soft filler particles is highest when there is some melting of their surface, it is desirable to limit the amount of melting in order to retain the soft characteristics of the metal oxide agglomerates or aggregates. The melted and re-solidified oxide tends to form coating particles of larger than 200 nanometers and may result in undesirable blade wear.

It is most desirable to limit the molten and re-solidified metal oxide of the agglomerates or aggregates to less than 15 volume % of the final coating or less than 8 volume % or most desirably, less than 4 volume %. The exemplary coating may have a cohesive bond strength of 500-3000 psi (3.4-21 MPa), more specifically 750-2000 psi (5.2-14 MPa). This strength level may provide a desirable balance between erosion resistance and abradability. While lower bulk strength or cohesive bond strength results in improved abradability, lower strength tends to result in higher rates of coating loss by erosion.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A blade outer airseal comprising:
   a body comprising:
      an inner diameter (ID) surface;
      an outer diameter (OD) surface;
      a leading end;
      a trailing end;
      a metallic substrate; and
      a coating system atop the substrate along at least a portion of the inner diameter surface,
   wherein:
      at least over a first area of the inner diameter surface, the coating system comprises an abradable layer comprising a metallic matrix and a filler;
      the filler comprises aggregates of oxide particles, the oxide particles having a D50 size ≤200 nm;
      the aggregates comprise alumina and magnesia aggregates that occupy at least 40% by volume of the abradable layer; and
      the magnesia forms 0.1% to 2% weight percent of the total of alumina and magnesia.

2. The blade outer airseal of claim 1 wherein:
the particles having a D50 size ≤200 nm form at least 50 weight percent of the aggregates.
3. The blade outer airseal of claim 1 wherein:
a D50 size of the aggregates is 10 to 150 micrometers.
4. The blade outer airseal of claim 1 wherein:
less than 4 volume percent, if any, of the abradable layer is re-solidified metal oxide of the aggregates; and
a D50 size of the aggregates is 22 to 45 micrometers.
5. The blade outer airseal of claim 1 wherein:
a D50 size of the aggregates is 6 to 45 micrometers.
6. The blade outer airseal of claim 1 wherein the metallic matrix comprises:
an MCrAlY.
7. The blade outer airseal of claim 1 wherein:
the matrix forms 20-35 volume % of the abradable layer.
8. The blade outer airseal of claim 1 wherein:
a Vickers hardness of the abradable layer is ≤300 with a 50 g load.
9. The blade outer airseal of claim 1 wherein:
the matrix forms 20-45 volume % of the abradable layer.
10. The blade outer airseal of claim 1 wherein:
the abradable layer has a cohesive bond strength of 500-3000 psi.
11. The blade outer airseal of claim 1 wherein:
the abradable layer has 40-80% said filler by volume.
12. A method for manufacturing the blade outer airseal of claim 1 the method comprising:
thermal spray of the abradable layer.

13. The method of claim 12 wherein:
the thermal spray uses a source material for the filler having the aggregates.
14. The method of claim 13 wherein:
the source material comprises said aggregates having particle D50 size of 10 nm to 50 nm; and
the aggregates in the source material have a compressive strength of 50 to 100 psi as determined by bulk powder compressibility.
15. The method of claim 13 wherein:
the source material comprises said aggregates having particle D50 size of 10 nm to 50 nm; and
said aggregates in said source material have 70-90% porosity.
16. The method of claim 13 wherein:
the particles having a D50 size ≤200 nm form at least 50 weight percent of the aggregates.
17. The method of claim 13 wherein:
a D50 size of the aggregates is 10 to 150 micrometers.
18. The method of claim 13 wherein:
less than 4 volume percent, if any, of the abradable layer is re-solidified metal oxide of the aggregates; and
a D50 size of the aggregates is 22 to 45 micrometers.
19. The method of claim 13 wherein:
a D50 size of the aggregates is 6 to 45 micrometers.
20. The method of claim 13 wherein the metallic matrix comprises:
an MCrAlY.
21. The method of claim 13 wherein:
the matrix forms 20-35 volume % of the abradable layer.

* * * * *